(12) United States Patent
Sakamoto

(10) Patent No.: US 6,437,835 B1
(45) Date of Patent: Aug. 20, 2002

(54) SYSTEM AND METHOD FOR TRANSFER OF AN INTERLACED VIDEO SIGNAL OVER A DATA BUS FOR USE BY A NON-INTERLACE VIDEO SIGNAL DEVICE

(75) Inventor: Susumu Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/941,596

(22) Filed: Oct. 2, 1997

(30) Foreign Application Priority Data

Oct. 11, 1996 (JP) .............................................. 8-289154

(51) Int. Cl.[7] ................................................. H04N 9/64
(52) U.S. Cl. ........................ 348/714; 348/716; 348/448
(58) Field of Search ................................. 348/714, 415, 348/716, 446, 441, 700, 701, 384.1, 448

(56) References Cited

U.S. PATENT DOCUMENTS 4,969,042 A * 11/1990 Houtman ..................... 348/552
5,301,240 A * 4/1994 Stockum et al. ................ 382/1
5,682,208 A * 10/1997 Harney ........................ 348/699
5,835,636 A * 11/1998 Auld ............................ 348/714

OTHER PUBLICATIONS

Phillips Semiconductor Data Handbook, May 1995, "Multimedia bridge scaler and PCI circuit".

* cited by examiner

Primary Examiner—Victor R. Kostak
(74) Attorney, Agent, or Firm—Michael Best & Friedrich Laff, Whitesel & Saret, Ltd., LLC; J. Warren Whitesel, Ltd.

(57) ABSTRACT

A system for transferring video data includes a difference detector for detecting the difference between a current field information and the preceding field information. The preceding information is obtained from an entered interlaced video signal. An interpolator generates current display frame information in response to an interpolation based upon the current filed information with regard to an area of the video signal in which there is a difference value between successive fields that exceeds a predetermined threshold value. The interframe difference between the current display frame information and preceding display frame information is detected by the difference detector. Only the interframe difference is transferred over a system bus to enable a frame display to be presented on non-interlacing display device.

11 Claims, 8 Drawing Sheets

F I G. 2
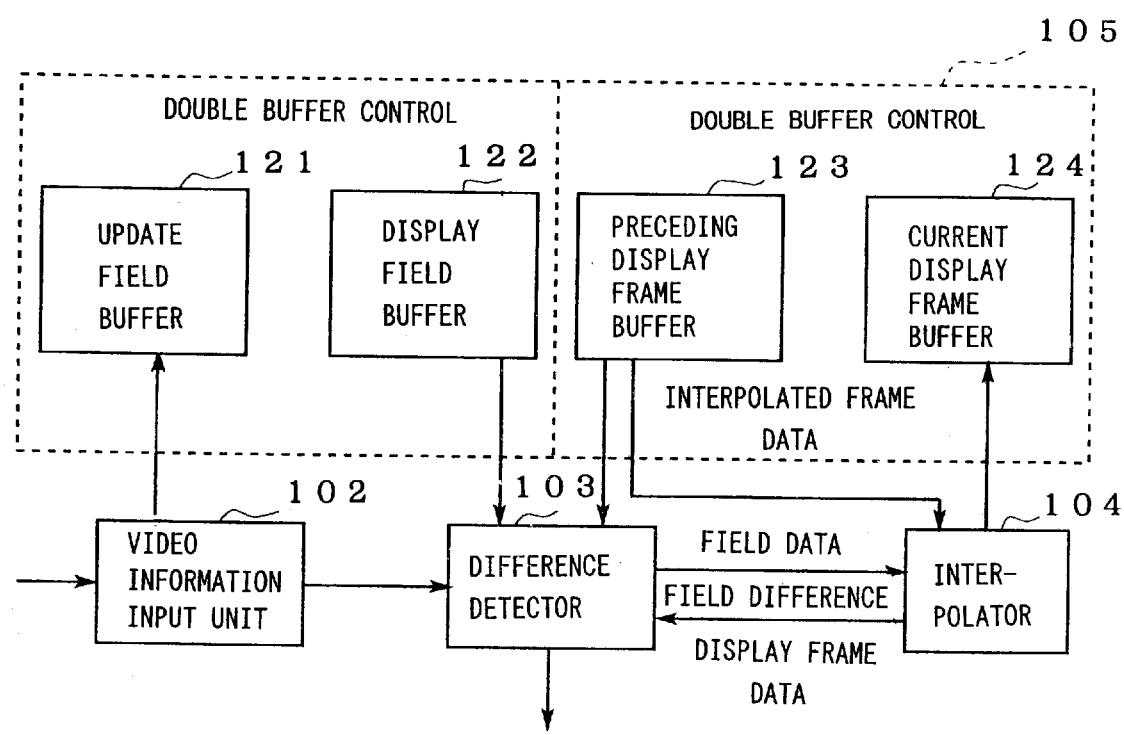

SYSTEM AND METHOD FOR TRANSFER OF AN INTERLACED VIDEO SIGNAL OVER A DATA BUS FOR USE BY A NON-INTERLACE VIDEO SIGNAL DEVICE

FIELD OF THE INVENTION

This invention relates to display of video for displaying a video signal such as interlaced video, e.g. a television video signal or a video signal obtained from a laser disk, on a non-interlacing display device of an information processing apparatus. More particularly, the invention relates to display of video data on the display device of a system via a system bus.

1. Background of the Invention

The format for displaying video from a television or laser disk is an interlaced display format in which even-numbered scanning lines and odd-numbered scanning lines are alternately displayed every $1/60$ of a second. The even-numbered scanning lines are referred to collectively as an even field and the odd-numbered scanning line are referred to collectively as an odd field. An even field and an odd field are combined to form a frame.

In an information processing apparatus such as a personal computer, there are instances where an interlaced video signal (from a television or laser disk) is acquired and displayed on a non-interlacing display device. In such cases, a so-called overlay technique is required. Several methods are used to achieve overlay.

According to one method, which is an independent path scheme, as shown in FIG. 5, a video display path which includes a video input unit 54, a video display device 55 and a buffer 56 is provided separately of a system display path which includes a system bus 51, a system display device 52 and a buffer 53. Overlay is achieved by changing over a display changeover switch 57 at the final display stage.

According to a second method, which is illustrated in FIG. 6, video data from a video input 64 flows into a buffer 63 of a system display device 62 via a system bus 61 so that overlay is implemented solely by the system display path.

2. Discussion of the Related Art

Towards the present invention the following problems have been encountered according to the inventor's analysis.

In the first method described above, the video display path and the system display path are independent of each other even though overlay is achieved. Consequently, though there is no influence upon the performance of the overall system, a problem which arises is that it is difficult to control the timing of the switch 57 at the final display stage.

By contrast, the second method dispenses with switch control at the final display stage and the circuit arrangement is simpler than that of the first method. However, since the video data is displayed via the system bus, the influence upon the performance of the overall system is great.

In the system of the second method, the video data must be transferred to the system bus periodically. In addition, it is required that a fixed amount of data be transferred at all times. In a case where utilization of the system bus cannot be acquired periodically, frames go missing from the video picture and smooth motion cannot be achieved.

Further, the system bus used in modern personal computers is such that when one of a number of devices connected to the system bus is utilizing the bus, the other devices cannot utilize the bus. Consequently, when the system bus is occupied periodically in order to display video, a decline in the performance of the system is unavoidable.

In a display of video data, the field data must be updated on the average of every $1/60$ of a second. The reason for the update on the average of every $1/60$ of a second is that there are cases where the picture update frequency on the system display side differs from the picture update frequency of the video signal. Accordingly, it is required that the system bus be acquired periodically every $1/60$ of a second.

Further, with regard to video data, data transfer at a rate of e.g. 20 megabytes per second must be carried out at all times.

A PCI (Peripheral Component Interface) bus, for example, is used as the general system bus in modern personal computers. The data transfer capability of this bus is a maximum of 132 megabytes per second. However, in the ordinary operating state, the data transfer capability is at most 50 to 60 percent of the maximum value, depending upon the load connected to the system bus.

Further, LSI chips of this kind currently available do not perform the buffer control carried out by special-purpose LSI chips or the like for processing video signals. This means that the buffer on the system display side must be written in sync with the input timing of the video data.

By way of example, refer to "Multimedia bridge scaler and PCI circuit" in the Philips Semiconductors publication DATA HANDBOOK IC22, July 1995, pp. 653–654.

In general, the system display side is not equipped with a function for presenting a field display with respect to a video input signal of this kind, and for this reason a frame display is presented. This gives rise to a phenomenon, referred to as a "motion artifact", in which contour lines produced by motion resulting from the time difference between interlaced fields take on jagged appearance.

Further, in the conventional systems, no consideration is given to means for reducing the amount of data transfer.

SUMMARY OF THE INVENTION

Accordingly, an object of the present invention is to provide a video display scheme, system, or method in which the occupancy of a system bus at the time of a video data transfer is reduced and/or the occurrence of motion artifacts in a frame display is avoided.

It is another object of the present invention to provide a computer system which allows a video display receiving an interlaced video signal but can display the same in the non-interlaced video displaying system with a reduced occupancy of a system bus. Further objects of the present invention will become apparent in the entire disclosure.

According to the present invention, there is provided a video display system for storing interlaced video data in a buffer of a non-interlacing image display device via a system bus and displaying the video data, wherein the video display system has a frame buffer and only a difference from an immediately preceding picture is transferred to the system bus.

More specifically, according to the gist of the present invention, new frame information is created by interpolating entered interlaced video data based on a difference between fields and immediately preceding display frame information, transferring only the difference from the immediately preceding display frame information to the system bus and presenting a frame display.

In accordance with the present invention thus constructed, motion artifacts are not displayed and occupancy of the system bus is reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating the details of a frame buffer according to this embodiment of the invention;

DESCRIPTION OF THE PREFERRED EMBODIMENT

A preferred embodiment of the present invention will be described below.

According to this preferred embodiment of the present invention, a system is provided with a difference detector which detects difference information between current field information and preceding field information based on entered interlaced video signals, and an interpolator which generates current display frame information by interpolation based upon the current field information with regard to an area in which a difference value between the fields exceeds a predetermined threshold value. The interframe difference between the current display frame information and preceding display frame information is detected by a difference detector and only the interframe difference is transferred to a system bus so that a frame display is presented on a non-interlacing display device.

With regard to an area in which the difference value between fields is at or below the predetermined value, the interpolating means generates the preceding display frame information by interpolation based on the current field information and preceding display frame information.

Further, in a preferred embodiment of the present invention, the system is provided with a frame buffer for storing preceding field information and current field information as well as preceding display frame information and current display frame information as current display frame information. In the frame buffer, the items of preceding field information and current field information as well as the items of preceding display frame information and current display frame information are each subjected to double buffering control.

The preferred embodiment of the invention will now be described in further detail with reference to the accompanying drawings.

Figure 1:
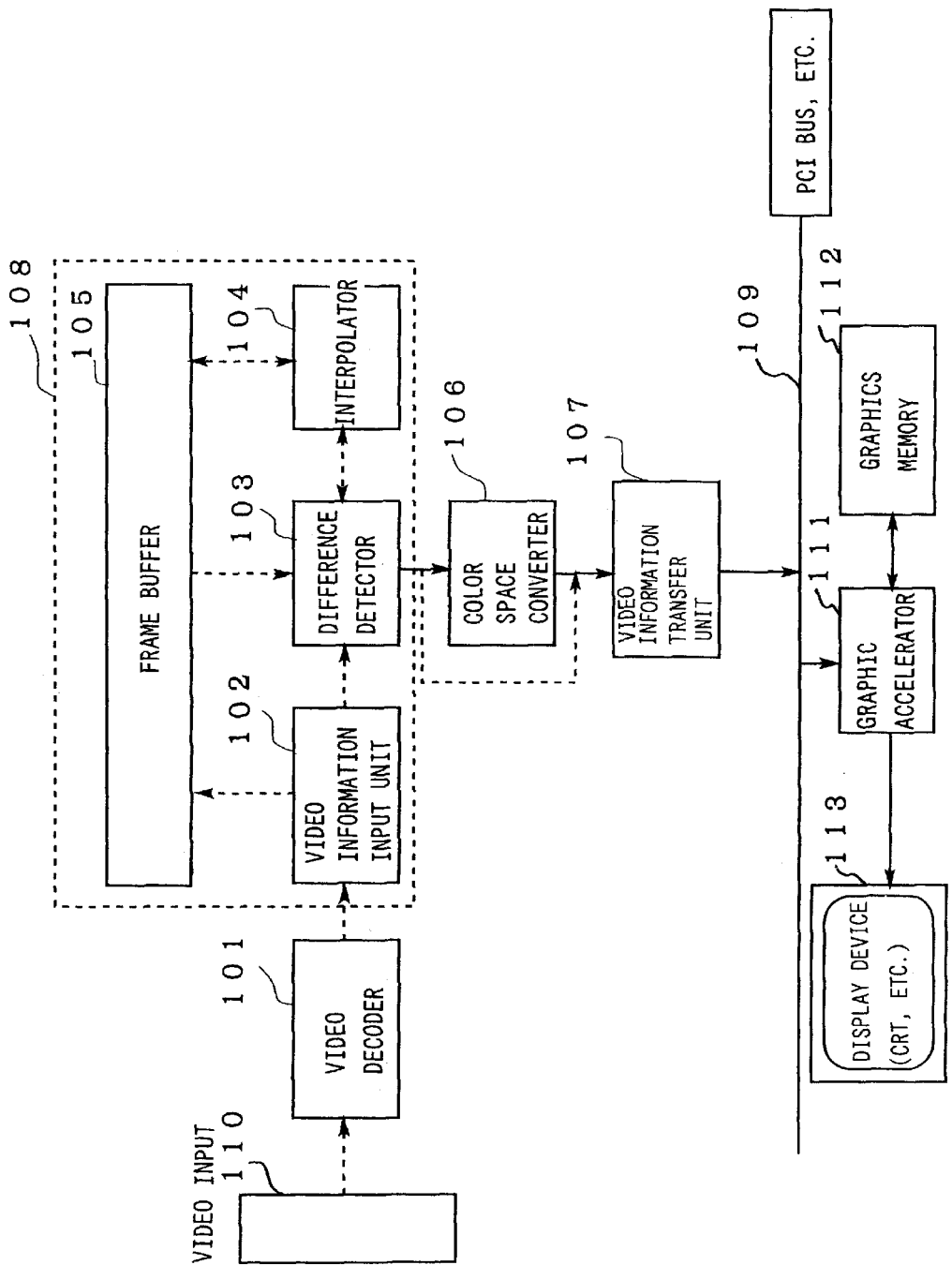
FIG. 1 is a block diagram showing the construction of an embodiment of the present invention.

FIG. 1 is a block diagram showing the construction of an embodiment of the present invention, and FIG. 2 is a diagram illustrating the details of the portion enclosed by the dashed line in FIG. 1.

As shown in FIG. 1, video data from a video input unit 110 is converted from an analog signal to a digital signal by a video decoder 101 and the digital signal is separated into a luminance component and color difference components. The video data that has been converted to a digital signal is written to an update field buffer 121 (see FIG. 2) in a frame buffer 105 by a video-information input unit 102 and, at the same time, the video data is sent from the video-information input unit 102 to a difference detector 103.

The difference detector 103 reads information out of whichever display field buffer in frame buffer 105 has been written by the video-information input unit 102 and calculates the difference between this information and the field information sent from the video-information input unit 102. In other words, the difference detector 103 calculates the difference between one field and the next.

Detection of a moving object in a picture is performed based upon this difference calculation. The difference information is sent from the difference detector 103 to an interpolator 104 along with the field data.

Figure 4:
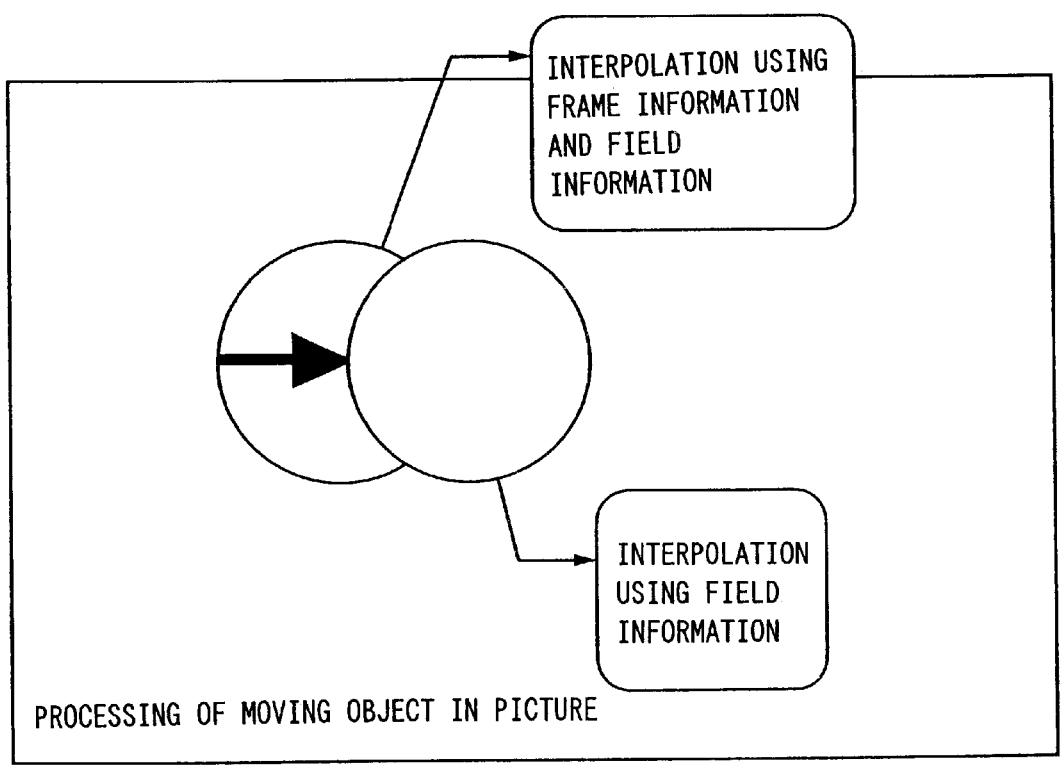
FIG. 4 is a diagram schematically illustrating an interpolation method performed by an interpolator according to this embodiment of the invention.
Figure 5:
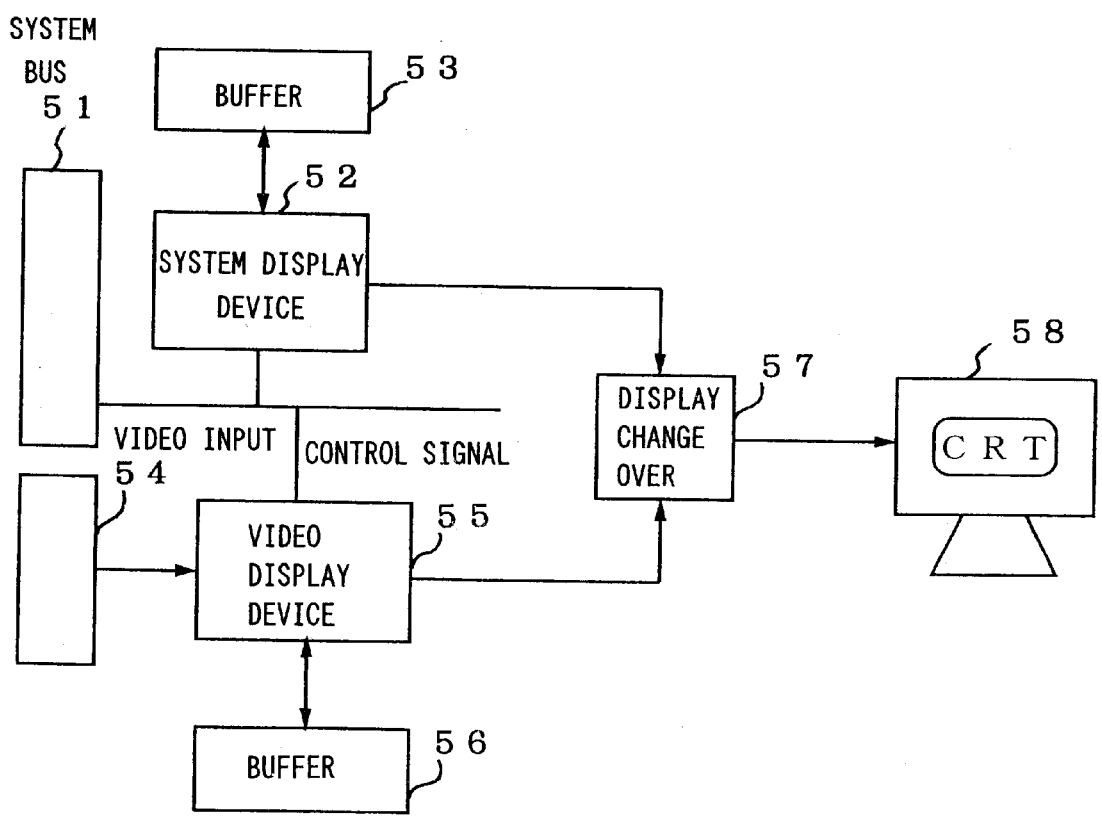
FIG. 5 is a diagram showing a first prior-art arrangement for implementing an overlay technique.
Figure 6:
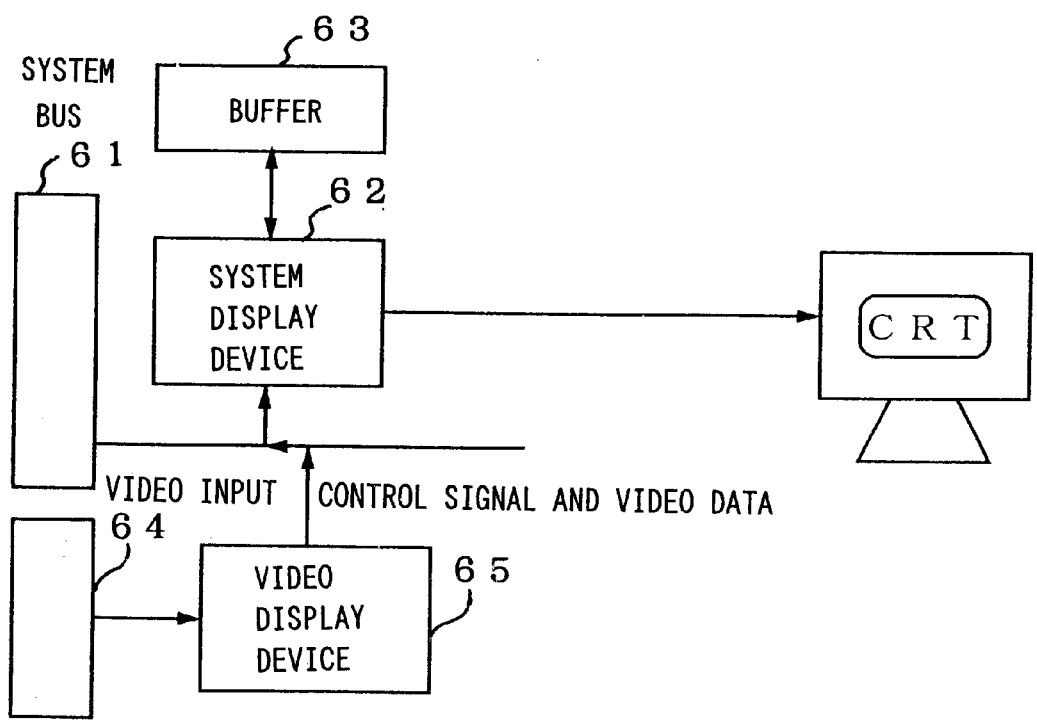
FIG. 6 is a diagram showing a second prior-art arrangement for implementing an overlay technique.
Figure 7:
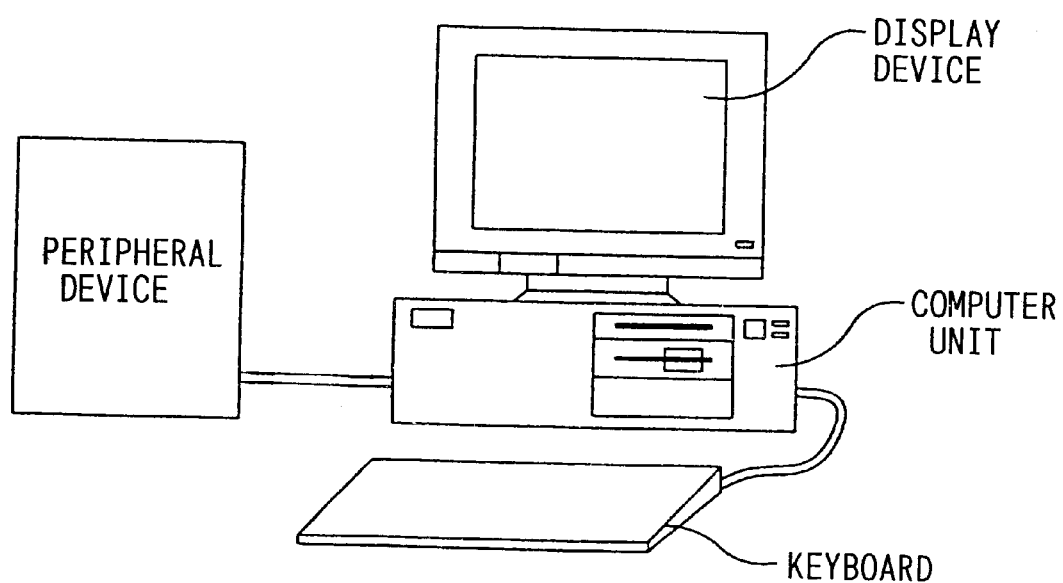
FIG. 7 is a schematic view of a computer system.

On the basis of the results of detection, the interpolator 104 performs interpolation using the display field information in the case of a moving object, as shown in FIG. 4. With regard to a stationary or relatively slowly moving object, the interpolator 104 performs interpolation using both the preceding display frame information and field information.

The interpolator 104 performs interpolation, creates display frame information, sends the display frame information back to the difference detector 103 and, at the same time, writes this information to a current display frame buffer 124.

The difference detector 103 calculates the difference between the display frame information sent back from the interpolator 104 and data read out of a preceding display frame buffer 123 and sends only this difference(information) to a color space converter 106 or directly video information transfer unit 107.

Figure 3:
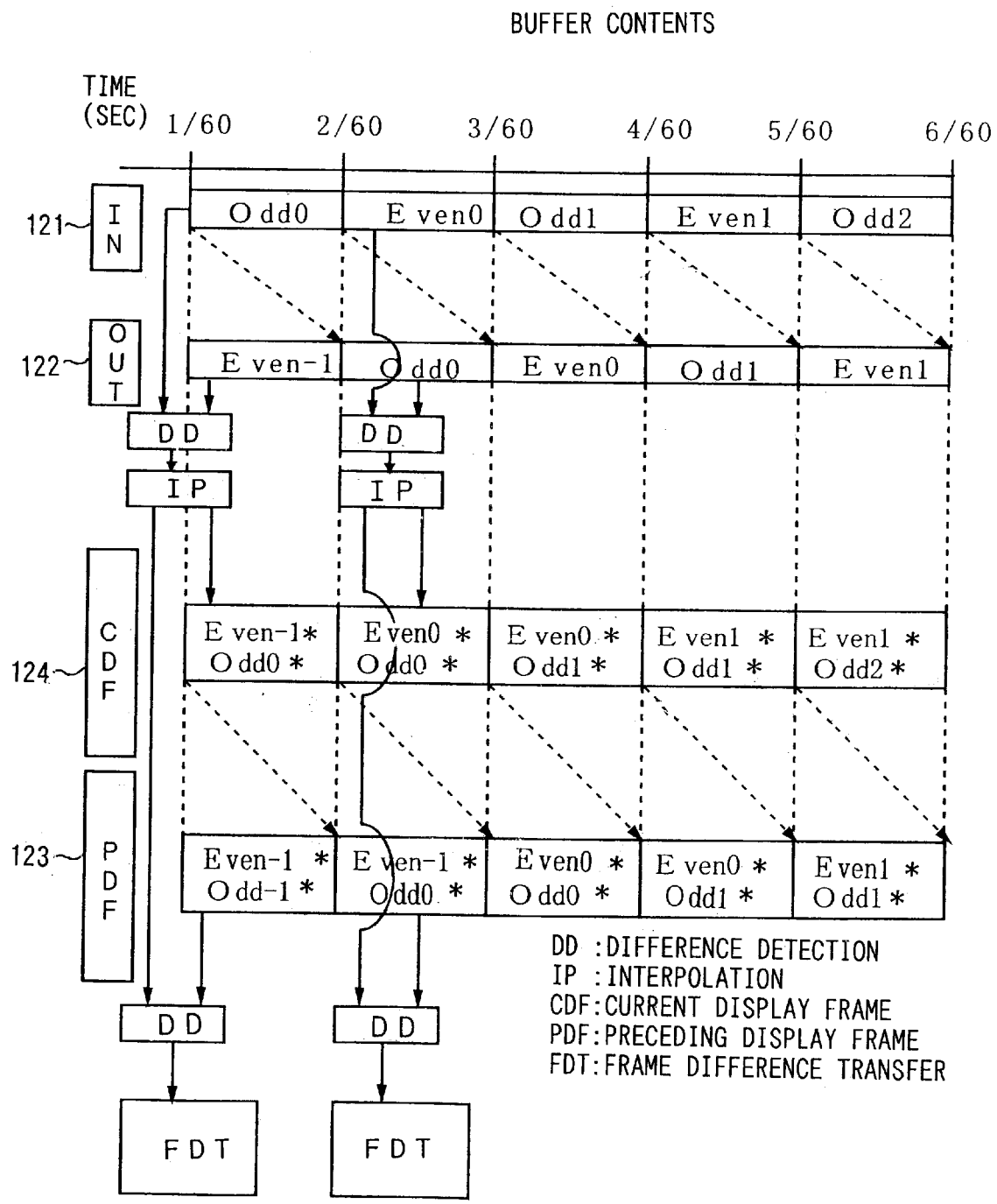
FIG. 3 is a diagram, which is useful in describing the operation of this embodiment, schematically showing a change in the content of buffers as well as a sequence leading up to display utilizing the change in content.

FIG. 3 schematically illustrates data processing from entry to display of video data. The numerals following "Odd" and "Even" indicate order in terms of time.

As shown in FIG. 3, video data enters first as "Odd0" and then as "Even0".

Further, in the current display frame and preceding display frame, a mark "New" (referred to as "*" in FIG. 3) is attached to "Odd" and "Even". When data is developed into frame information by the interpolator 104, the interpolation is performed using both the preceding frame information and the current field information, as shown in FIG. 4. Therefore, since the interpolated frame information is different from the original field information, "New" (*) is attached to the interpolated frame information in order to distinguish it.

FIG. 3 shows stored contents of each of buffers at every clock interval of ⅙₀ sec, in which the first, second, third and fourth levels represent update field buffer 121, display field buffer 122, current display frame buffer 124 and preceding display frame buffer 123, respectively, in this order from the top. Now, the first level of update field buffer 121 receives an input data(Odd0) at an initial timing(⅙₀ sec), the data are stored in the first level in the order of Odd0=Even0=Odd1=Even1=Odd2 . . . At next timing(²⁄₆₀ sec), the stored data at the first level is supplied to the second level, display field buffer 122 by way double buffer control. The second level stored contents are in the order of: Even−1=Odd0=Even0=Odd1=Even1 . . . starting from the initial clock timing(⅙₀ sec). At the initial timing, a difference between the input data(Odd0) from the video information input unit and the output data(Even−1) of the display field buffer 122 is detected by the difference detector 103, to generate an interpolated data(Even−1*, Odd0*) which is stored in the current display frame buffer 124. (On the other hand, this interpolated data is subjected to difference detection with a data of the preceding frame buffer at the same time.) At the next clock timing(2/60 sec), this interpolated data(Even−1*, Odd0*) is forwarded to the preceding frame buffer 123. At this timing(2/60 sec), a next interpolated data(Even0*, Odd0*) which has been obtained likewise at the first timing (1/60 sec) (i,e., the same as data of the current display frame buffer 124) is subjected to difference detection with a data(Even−1*, Odd0*) of the preceding display frame buffer 123, followed by transferring of the detected frame difference. Similar steps will be repeated at every subsequent clock timing.

In a case where the system display device such as a graphics accelerator is equipped with a color space conversion function, the color conversion converter 106 is so adapted that the video information sent from the video information transfer unit 107 will pass through.

The four buffer areas in the frame buffer 105, namely the update field buffer 121, a display field buffer 122, the preceding display frame buffer 123 and the current display frame buffer 124, are changed(or switched) over and updated by double buffering control.

In accordance with the video display apparatus of the present invention, as described above, an advantage is that the occupancy of the system bus can be reduced even though video data is transferred via the system bus.

Further, in accordance with the present invention, the motion-artifact phenomenon, in which a shift in motion owing to a time difference between fields appears as video, can be made less conspicuous even when interlaced video is displayed using a frame display.

Figure 8:
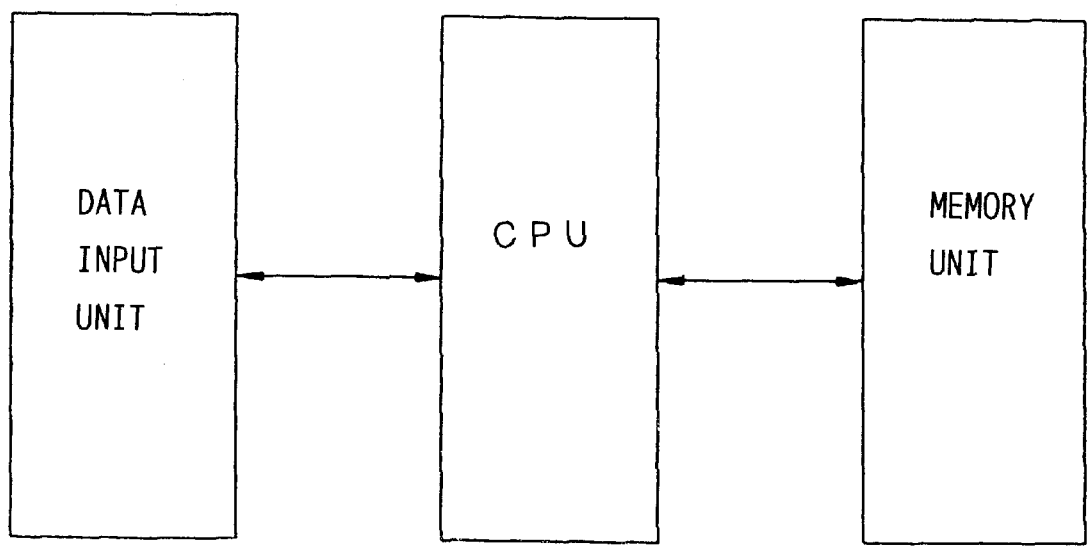
FIG. 8 is a block diagram of a computer system.

Typically the video display system is used as a part of a computer system such as personal computers. The computer system generally comprises CPU(e.g., microprocessor), memory unit and data input unit as shown in FIG. 8. The personal computer typically comprises computer unit (main body), a display device (typically CRT), and a keyboard as a data input device. It further comprises other peripheral devices. The data input unit is adapted to receive the interlaced video information. The display device is generally adapted to display the non-interlaced video.

As many apparently widely different embodiments of the present invention can be made without departing from the spirit and scope thereof, it is to be understood that the invention is not limited to the specific embodiments thereof except as defined in the appended claims.

What is claimed is:

1. A system for transferring video data, comprising:
    difference detecting means for detecting difference information between current field information and preceding field information obtained from an entered interlaced video signal; and
    interpolating means for generating current display frame information by interpolation based upon the current field information with regard to an area in which a difference value between the fields exceeds a predetermined threshold value;
    wherein an interframe difference between the current frame information and the preceding display frame information is detected by said difference detecting means;
    only the interframe difference is transferred to a system bus so that a frame display is presented on a non-interlacing display device; and
    a frame buffer which stores preceding field information and current field information as well as preceding display frame information and current display frame information, each of the items of preceding field information and current field information as well as the items of preceding display frame information and current display frame information being subjected to double buffering control in said frame buffer.

2. A personal computer comprising:
    an input unit adapted to receive interlaced video data,
    a display device adapted to display non-interlaced video data,
    a system for transferring video data, said system comprising:
    difference detecting means for detecting difference information between current field information and preceding field information obtained from an entered interlaced video signal;
    interpolating means for generating current display frame information by interpolation based upon the current field information with regard to an area in which a difference value between the fields exceeds a predetermined threshold value;
    wherein an interframe difference between the current display frame information and the preceding display frame information and the preceding display frame information is detected by said difference detecting means; and
    only the interframe difference is transferred to a system bus so that a frame display is presented on the non-interlacing display device,
    wherein said system further comprises a frame buffer which stores preceding field information and current field information as well as preceding display frame information and current display frame information, and
    wherein the items of preceding field information and current field information as well as the items of preceding display frame information and current display frame information are each subjected to double buffering control in said frame buffer.

3. The computer according to claim 2, wherein, with regard to an area in which the difference value between fields is at or below the predetermined value, said interpolating means generates current frame information by interpolation based on the current field information and the preceding display frame information.

4. A system for storing interlaced video data in a buffer memory of a non-interlacing video display device, and for displaying pictures responsive to said video data, the transferring of said video data being via a system data bus, the system comprising:
    a frame buffer memory means for receiving and temporarily storing sequential video picture signals,
    difference detecting means for detecting difference information between current field information and preceding field information obtained from interlaced video signals stored in said buffer memory means; and
    means for transferring only the detected difference information from the preceding picture to a system data bus so that pictures are displayed on said non-interlacing video display device;
    whereby the volume of video signal traffic on said system data bus is reduced.

5. A system for storing interlaced video data in a buffer memory of a non-interlacing video display device, and for displaying pictures responsible to said video data, the transferring of said video data being via a system data bus, said system comprising:

a frame buffer memory means for receiving and temporarily storing sequential video picture signals;

difference detecting means for detecting difference information between a current video field information and a preceding video field information, said preceding video field information being obtained from stored interlaced video signals;

interpolating means for generating current display frame information by interpolation based upon the current field information with regard to a frame area information in which a difference value between the fields exceeds a predetermined threshold value;

a means for transferring video signals of only interframe difference detected by difference detecting means to a system bus; and displaying said transferred video signals on a non-interlacing display device.

6. The system according to claim 5, wherein said interpolating means generates current frame information by interpolation based on the current field information and the preceding display frame information in response to said area information in which the difference value is at or below the predetermined threshold value.

7. A personal computer comprising:

an input unit adapted to receive interlaced video data, a display device adapted to display said non-interlaced video data, a system for storing said interlaced video data in a buffer memory of the non-interlacing video display device, means for detecting differences between successive picture data, and means for transferring only said difference data via a system bus to said display device for displaying video pictures, wherein only said difference from the preceding picture is transferred via the system bus for displaying pictures on said display device.

8. A personal computer comprising:

an input unit adapted to receive interlaced video data, a display device adapted to display non-interlaced video data, and a system for transferring video data, said system comprising:

difference detecting means for detecting difference information between current field information and preceding field information obtained from an interlaced video signal entered in a buffer memory;

interpolating means for generating current display frame information by an interpolation based upon the current field information with regard to an area in which a difference value between successive fields of video data exceeds a predetermined threshold value;

wherein an interframe difference between the current display frame information and the preceding display frame information is detected by said difference detecting means; and means for transferring only the interframe difference to a system bus extending to said display device so that a frame display is presented on the non-interlacing display device.

9. The computer according to claim 8, wherein said interpolating means generates the preceding display frame information by an interpolation based on the current field information and the preceding display frame information in response to the difference value being at or below said predetermined value.

10. The system according to any one of the claims 1, 4, 5, 8, wherein, with regard to an area in which the difference value between fields is at or below the predetermined value, said interpolating means generates current frame information by interpolation based on the current field information and the preceding display frame information.

11. The system according to claim 1, further comprising a frame buffer which stores preceding field information and current field information as well as preceding display frame information and current display frame information.

* * * * *